United States Patent [19]

Brun

[11] Patent Number: 4,919,588
[45] Date of Patent: Apr. 24, 1990

[54] SWEEP STACKER

[75] Inventor: Charles J. Brun, Xenia, Ohio

[73] Assignee: Kindex, Inc., Laura, Ohio

[21] Appl. No.: 309,178

[22] Filed: Feb. 13, 1989

[51] Int. Cl.$^5$ .............................................. B65G 57/16
[52] U.S. Cl. .............................. 414/798.4; 414/788.4; 414/798.7; 414/908; 414/27; 198/468.11
[58] Field of Search .................. 414/788.2, 788, 798.2, 414/798.4, 798.7, 27, 908, 661, 790.3, 788.3, 788.4; 425/554, 556; 198/468.8, 468.11, 487.1

[56] References Cited

U.S. PATENT DOCUMENTS

| | | | |
|---|---|---|---|
| 3,195,444 | 7/1965 | McLean | 414/27 X |
| 3,240,356 | 3/1966 | Hill | 414/684 X |
| 3,773,457 | 11/1973 | Badoux et al. | 414/798.4 X |
| 3,884,369 | 5/1975 | Tomlinson | 414/27 |
| 4,268,210 | 5/1981 | Furguson et al. | 414/661 X |
| 4,645,401 | 2/1987 | Hopkins et al. | 414/908 X |
| 4,723,883 | 2/1988 | Smith | 414/798.2 X |

Primary Examiner—Robert J. Spar
Assistant Examiner—James T. Eller
Attorney, Agent, or Firm—Barnes & Thornburg

[57] ABSTRACT

A stacking apparatus is disclosed which is situated so as to receive elements as they are ejected from an element-forming apparatus. A holder is provided for holding a plurality of the elements in spaced relationship to each other. Two or more parallel rods, movable in the lengthwise direction of the rods, move relative to the holder from a position adjacent to the elements to a position whereby the rods penetrate the plurality of elements while the elements remain in spaced relationship to each other. When the plurality of elements are so penetrated, the holder is moved downward relative to the rods such that the plurality of elements are free from and are suspended above the holder. A sweeping mechanism, which can include at least one stub shaft, is then moved relative to the base in a path parallel to the length direction of the rods so as to serially engage all of the elements suspended on the rods and sweep the elements from the rods into a nesting relation to each other towards a final position free from the parallel rods. An abutment fixed with respect to a base of the apparatus provides a stop toward which the elements are swept by the sweeping mechanism for accumulating the elements in the stacked relationship. After the elements are delivered to a position adjacent the abutment, the movable parallel rods and the sweeping mechanism are returned to their initial position to permit a subsequent delivery of elements from the element forming apparatus into the holder.

10 Claims, 3 Drawing Sheets

SWEEP STACKER

BACKGROUND OF THE INVENTION

This invention generally relates to the stacking of elements and particularly to the stacking of products as they are ejected from a molding machine. The invention has particular utility with products or elements having a cooperative nesting feature whereby the products can be conveniently telescoped one with respect to another. The illustrated preferred embodiment has particular utility on products having a number of apertures to permit the handling of the products in the preferred manner.

Many types of products are formed in plastic molding machines. Particularly when the products are formed in injection molding machines or vacuum forming machines, it is common for a multitude of products to be formed simultaneously. As the formed products are ejected from the machine at the end of the forming process, the products often are merely permitted to fall from the machine into a large container for later handling either by hand or by apparatus to line and stack the products. In certain circumstances, apparatus has been employed for handling the articles as they are ejected from the apparatus in such a way as to permit the stacking of the formed articles in an ordered array. The ordered array may be grouped with other similar arrays and packed for shipping or directed to subsequent apparatus for additional operations such as printing, filling, etc.

SUMMARY OF THE INVENTION

In accordance with the present invention, a stacking apparatus for stacking a plurality of elements includes a base and a first means movable with respect to the base into engagement with each of the plurality of elements for suspending each element in relation to the base. A second means is provided which is movable with respect to the first means for sweeping the elements along the first means into a stacked relationship. An abutment means provides a stop towards which the elements are swept by the second means for accumulating the elements.

In the preferred embodiment, a base of the apparatus is situated so as to receive elements as they are ejected from an element-forming apparatus. A holding means is provided for holding a plurality of the elements relative to the base in spaced relationship to each other. Two or more parallel rods, movable in the lengthwise direction of the rods, move relative to the base from a position adjacent the elements held by the holding means to a position whereby the rods penetrate the plurality of elements while the elements remain in spaced relationship to each other contacting the holding means. When the plurality of elements are so penetrated, the holding means is moved downward relative to the base such that the plurality of elements are free from and are suspended above the holding means. A sweeping mechanism which can include at least one stub shaft is then moved relative to the base in a path parallel to the length direction of the rods so as to serially engage all of the elements suspended on the rods and sweep the elements from the rods into a nesting relation to each other towards a final position free from the parallel rods. An abutment fixed with respect to the base provides a stop toward which the elements are swept by the sweeping mechanism for accumulating the elements in the stacked relationship After the elements are delivered to a position adjacent the abutment means, the movable parallel rods and the sweeping mechanism are returned to their initial position to permit a subsequent delivery of elements from the element forming apparatus into the holding means.

It is the general object of the present invention to provide an improved stacking apparatus and method for stacking articles as they are emitted from an article-forming apparatus. Another general object of this invention is to provide such an apparatus that is especially suitable for articles formed to nest with other similar articles. These and other objects of the present invention will become apparent to those skilled in the art upon consideration of the following detailed description of the preferred embodiment exemplifying the best mode of carrying out the invention as presently perceived. The detailed description refers particularly to the accompanying figures.

DESCRIPTION OF THE PREFERRED EMBODIMENT

Figure 1:
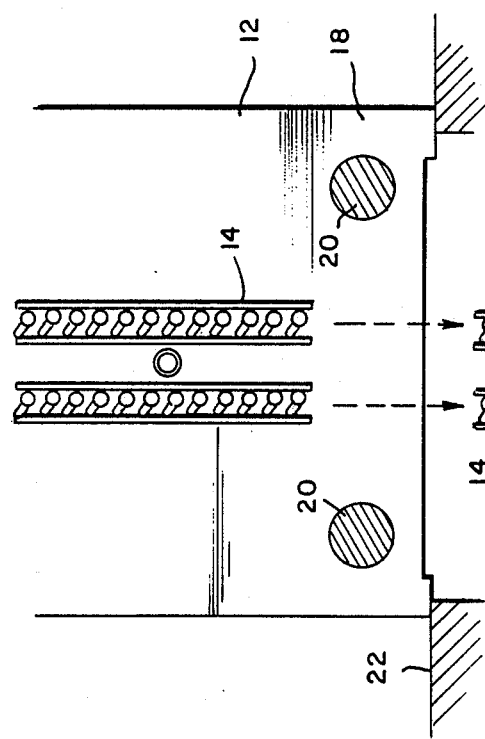
FIG. 1 is a side elevation view of an apparatus constructed in accordance with the present invention.
Figure 1:
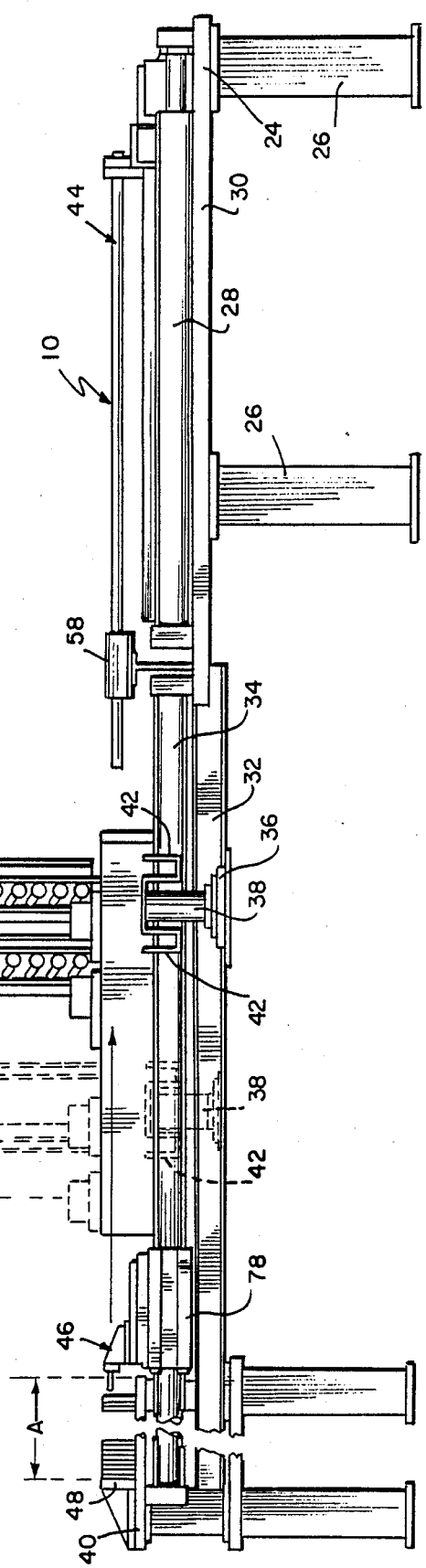

A stacking apparatus 10 constructed in accordance with the present invention is illustrated in FIG. 1 to be situated with respect to a molding machine 12 such that plastic articles 14, after being molded by the molding machine 12, fall under the influence of gravity into vertically-oriented chutes 16 of the stacking apparatus 10. The molding machine 12 is merely diagramatically illustrated to include the platen 18, tiebars 20, and base 22 of an injection molding machine. It will be understood by those skilled in the art that the present invention is broad enough to encompass the stacking of various types of articles formed by any manner whatsoever by various apparatus and that the illustrated embodiment is intended merely to show one particularly useful environment for the preferred embodiment.

The stacking apparatus 10 also includes a base 24 including legs 26 supporting the base above a floor not illustrated. In conventional arrangements, the base 22 of the molding apparatus 12 can be secured directly or indirectly to any portion of base 24 of the stacking apparatus 10 so as to insure the stability of relative position between the molding machine 12 and the stacking apparatus 10. The base 24 of the stacking apparatus is shown to include a first track 28 supported by a first track support 30. A second track support 32 is secured to the first track support 30. The second track support supports a second track 34 and supports a base 36 for a vertically movable element 38, more fully described later. At the left end of the second track support 32, the base includes an abutment support 40.

The vertically moving element 38 provides for vertical movement of holding means 42. The holding means 42 is shown in FIG. 1 in its lower position. The articles 14, after being received in the vertically-oriented chute 16 are transferred to the holding means 42 during the first step of a stacking operation in accordance with the present invention. This transfer from vertical chute 16 to holding means 42 is accomplished through a known procedure whereby the articles 14 are rotated about a vertical axis and then toppled with the aid of a blast of air directed at an upper end of articles 14. The articles 14 thus topple so as to be received in holding means 42. Such an air-assisted toppling action is disclosed, for example, in U.S. Pat. No. 2,833,185.

Additional vertical support chutes 16' and holding means 42' are shown in phantom to the left of chutes 16 and holding means 42. The exact number and location of chutes and holding means may be varied depending upon the number and orientation of parts to be produced or otherwise stacked by the apparatus 10 without departing from the present invention. Further, the articles 14 may themselves encompass more than a single part, the illustrated articles 14 are intended to represent a strip of identical parts retained together in ladder fashion by two strips located on opposite sides of the parts. The particular shape or nature of the articles 14 forms no part of the invention other than the fact that the articles 14 are preferably include some element of structure which adapts the articles for the oriented stacking procedure to be practiced by the apparatus 10.

Once the articles 14 have been received in holding means 42, a first suspending means 44 is moved along the first track 28 so as to engage a plurality of the elements 14 without any substantial movement of the elements. After the articles 14 are engaged by the first suspending means, the holding means 42 are moved downwardly by the vertically moving elements 38 leaving the articles suspended on the suspending means 44. A second sweeping means 46 shown in FIG. 1 in a far-left position then sweeps the articles from right to left as shown in FIG. 1 along the second track 34 toward the abutment 48. Additional details of the preferred mechanism and its operation are more fully illustrated and described in the following discussion relating to FIGS. 2 through 6.

Figure 2:
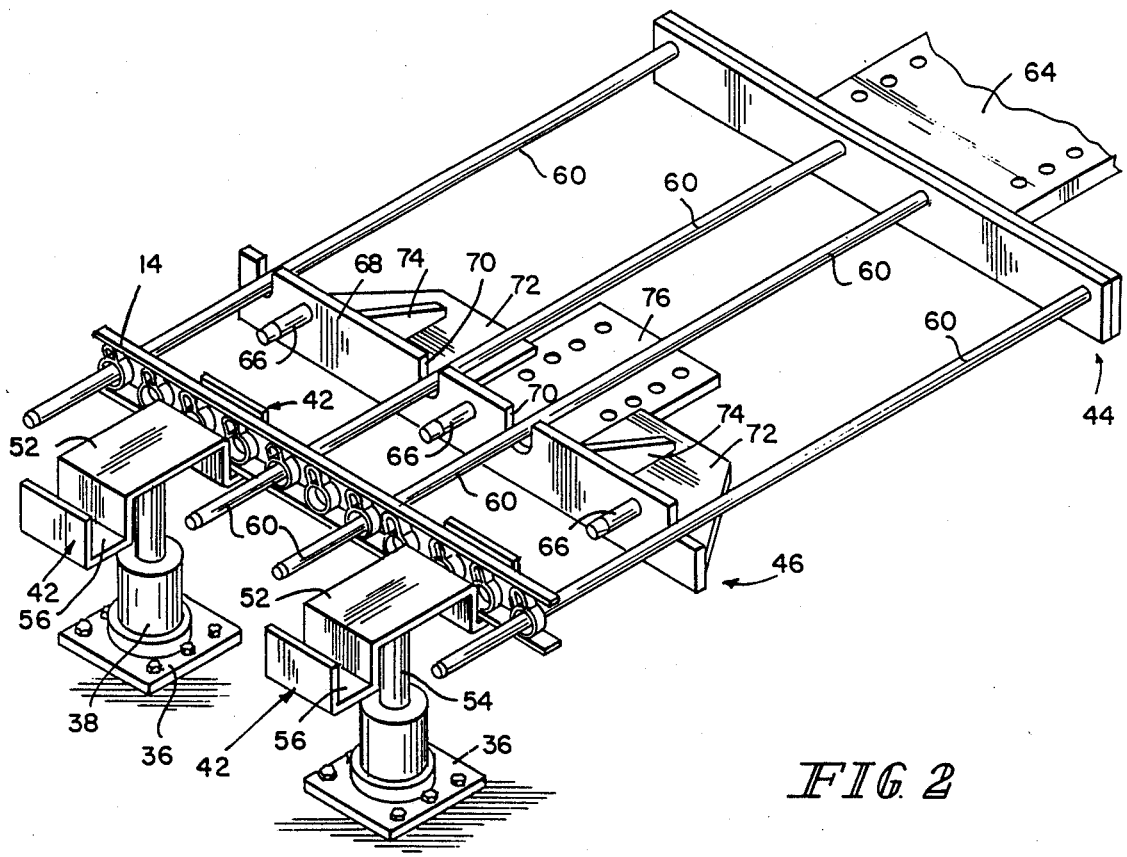
FIG. 2 is a perspective view of a portion of the apparatus shown in FIG. 1.

FIG. 2 illustrates the three active elements of the stacking apparatus of the present invention in a perspective view, but absent any of the supporting structure, so as to better illustrate the cooperation which occurs between the holding means 42, the suspending means 44 and the sweeping means 46 as they act together to perform the stacking operation on articles 14. The holding means 42 is shown to comprise a pair of spaced air-actuated cylinders 38 fixed to the respective bases 36. The air-actuated cylinders 38 could be replaced by other equivalent means such as solenoids, hydraulic cylinders, or other apparatus which would permit the vertical movement of holding means 42 with respect to bases 36. Each of the holding means 42 is shown to comprise a yoke-shaped bar having a central portion 52 fixed to piston rod 54 of cylinder 38. On each side of the central portion 52 of the bar is a U-shaped portion 56 adapted to receive article 14.

While the holding means 42 is illustrated to comprise a pair of cylinders 38, each cylinder in turn permitting the vertical movement of a spaced pair of U-shaped receiving slots 56, the number and arrangement of such cylinders 38 and slots 56 may be adapted to the particular use of the apparatus without departing from the scope of the present invention. In general, the holding means 42 are designed such that a plurality of articles 14 will be received from a molding or other operation in a spaced relationship and maintained in that relationship by the holding means until operated upon by other apparatus.

The suspending means 44 is shown to comprise a plurality of rods 60 protruding parallel to each other from a tiebar 62. The tiebar 62 is fixed to carrier plate 64 which is in turn mounted to an air-operated piston and track follower not shown capable of traveling along track 28 as illustrated in FIG. 1. The number of rods 60 is a matter of design dictated principally by the nature of the article 14 to be stacked by the stacking apparatus. The rods 60 are intended to penetrate an opening in article 14 as the rods move leftward from a far right position shown in FIG. 1. The rods 60 are guided in their travel by guide means 58 shown fixed to base plate 30 in FIG. 1. Once the rods 60 have penetrated article 14, the holding means 42 can be moved downward by the cylinders 38 leaving the articles 14 suspended on rods 60.

The sweeping means 46 is shown to comprise a plurality of stub shafts 66 which are also intended to penetrate an opening in article 14. These stub shafts could be replaced by a base plate or fork blades intended to underride the articles 14. The stub shafts 66 are joined together by plate 68 which is shown to have a plurality of notches 70 in its upper margin coincident with the position of rods 60. The notches 70 permit the intimate interpositioning of the rods 60 and stub shafts 66 so as to allow the handling of articles 14 having a small vertical dimension. The plates 68 are supported by backing plate 72 and reinforcement web 74 on carrier plate 76, which is in turn mounted to a shuttle 78 not shown in FIG. 2. The shuttle 78 is shown in FIG. 1 at a far left position and intended to travel along the length of track 34. As illustrated in FIG. 1, shuttle 78 and sweeping means 46 are shown in the far left position at the end of the sweeping operation whereas the sweeping means 46 is shown in FIG. 2 as it would be situated at the far right of track 34 prior to the sweeping operation.

Figure 3:
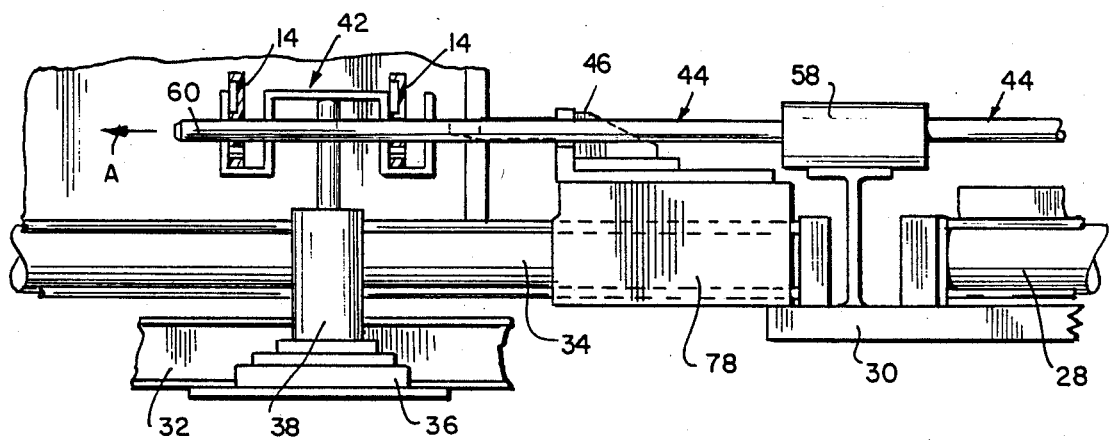
FIG. 3 is the detailed side elevation view showing the initial insertion of the suspending means into the plurality of elements held by the holding means.
Figure 4:
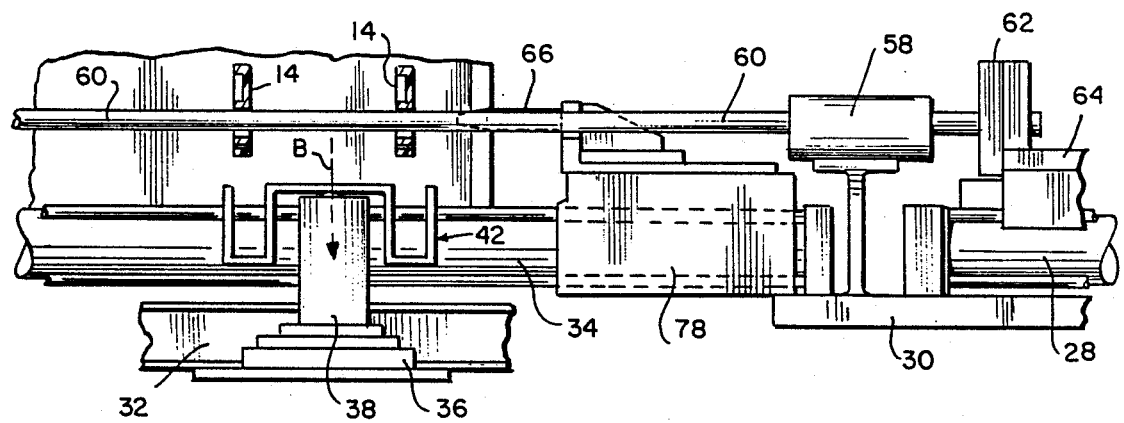
FIG. 4 is a view similar to FIG. 3 showing the withdrawing of the holding means prior to the motion of the sweeping means.
Figure 5:
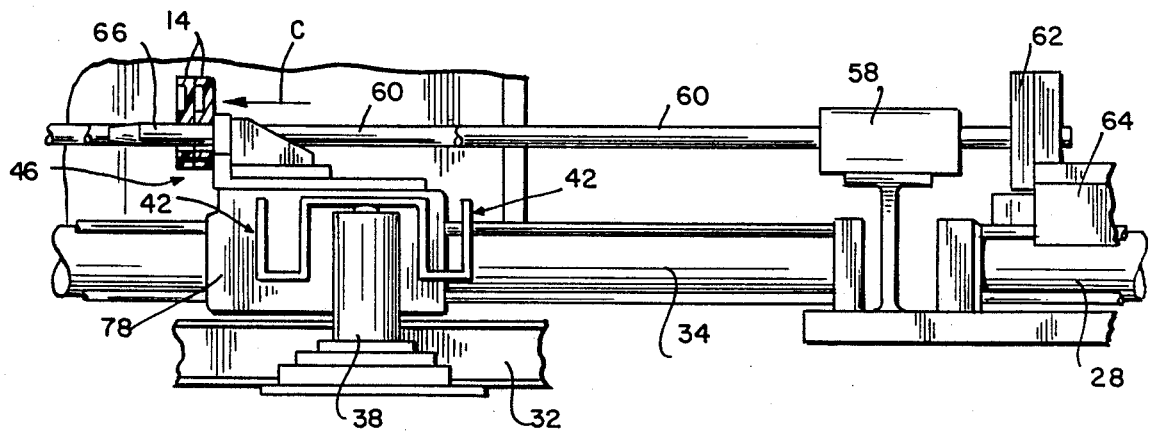
FIG. 5 is a view similar to FIGS. 3 and 4 showing the sweeping action of the sweeping means.

A review of FIGS. 3, 4, and 5 will provide a better understanding of the actual operation of the stacking apparatus 10 in accordance with the present invention. In FIG. 3, the holding means 42 has received a plurality of articles 14, the holding means 42 being shown in its upper position. The rods 60 of the suspending means 44 are shown moving leftward in the direction of arrow A from the initial position illustrated in FIG. 1 so as to penetrate openings in the articles 14. The sweeping means 46 is shown in the far right position awaiting completion of the leftward movement by the rods 60 of the suspending means 44.

Upon completion of the leftward movement of rods 60 as shown in FIG. 4, the holding means 42 are caused to move downwardly under the influence of the air cylinder 38 thereby leaving the elements 14 suspended in a spaced-apart relationship from each other on rods 60. Once the downward movement shown by arrow B of holding means 42 is completed, the sweeping means 46 can then move leftward in the direction of arrow C as shown in FIG. 5. This leftward direction of the sweeping means 46 causes a gathering together of the articles 14 on stub shafts 66. The shuttle 78 moves leftward along track 34 a distance sufficient to remove all of the spaced articles 14 from the rods 60 and bring them into contact with abutment 48 shown in FIG. 1. Preferably, the shuttle is caused to force the articles 14 against the abutment 48 with sufficient force to insure a nesting or interlocking of the articles. This nesting or interlocking of the articles adjacent to abutment 48 will then permit the shuttle 46 to return from the position shown in FIG. 1 to the position shown in FIG. 3 without carrying any of the articles 14 on the return trip out of region A shown in FIG. 1.

Figure 6:
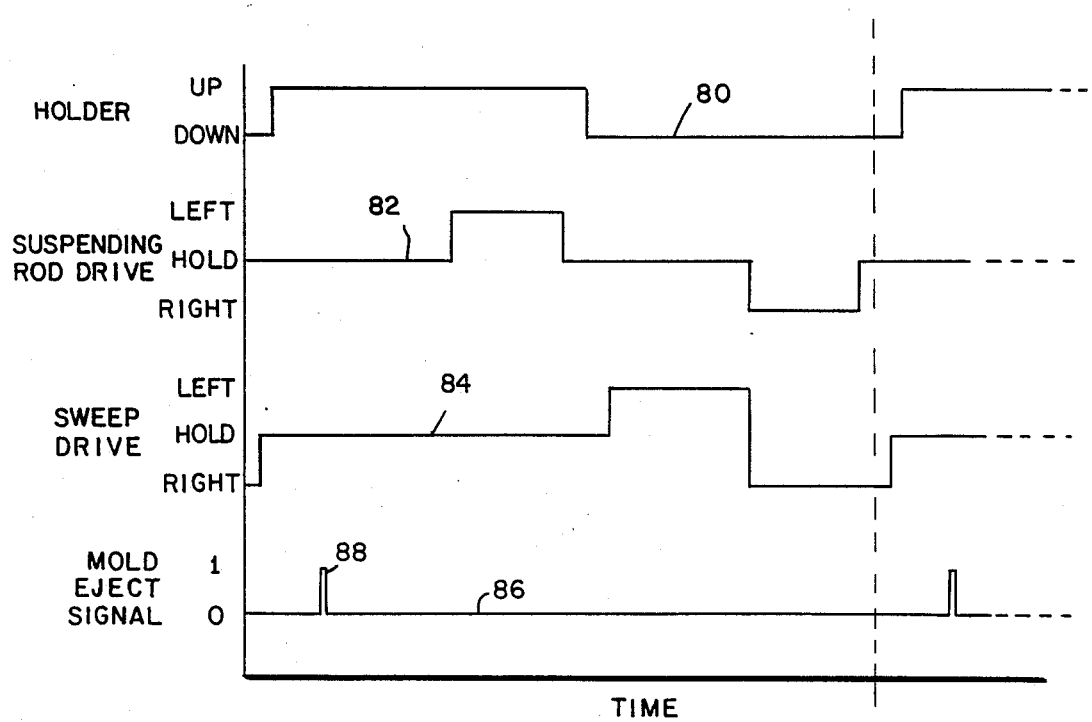
FIG. 6 is a timing chart showing the relative action of each of the movable portions of the illustrated apparatus.

FIG. 6 is a schematic diagram showing a complete cycle of the sweeping apparatus. The top line 80 shows the up and down movement of the holding means 42 by a moving means such as cylinder 38. Line 82 shows the movement of the suspending rods 60 by carrier plate 64 along track 28. The line 82 has three possible states, namely leftward movement, holding stationary at an existing position, and rightward movement. Examining lines 80 and 82 together, it is to be noted that rods 60 complete their leftward movement before the holding means 42 is moved from its upper position to its lower position. Likewise, the rods complete their full rightward movement before the holding means resumes it upward position.

Line 84 shows the movement of the shuttle 78 carrying the sweeping means 46. The three states of possible movement for the movement of the sweeping means 46 are the same as that of the suspending means 44. Comparing lines 84 and 80, it will be noted that the leftward movement of the sweep drive does not initiate until the holding means 42 is in the downward position. Further, the rightward movement of the sweep drive is completed before the holding means 42 moves to its upward position.

Finally, the bottom-most line 86 can be viewed as a triggering signal which may be obtained from the molding apparatus 12 or other machinery with which the stacking apparatus 10 is employed. A start signal shown by the quick upward rise 88 can be used by a conventional processor to control the motions of the holding means, suspending means, and sweeping means. In the present example, the signal 88 can constitute a mold opening signal indicating that the articles 14 are to be ejected from the mold. Alternatively, the signal 88 could be generated by a sensing means located for example at the bottom of one or more vertical chutes 16 signifying the receiving of articles 14 within the chutes 16. Other means for initiating the holding, suspending, and sweeping cycles of the present invention will be apparent to those skilled in the art.

Although the invention has been described in detail with reference to the illustrated preferred embodiment, variations and modifications exist within the scope and spirit of the invention as described and as defined in the following claims:

What is claimed:

1. Apparatus for stacking a plurality of elements, each element formed to nest with other similar elements, the apparatus comprising:
    a base, first track means fixed to the base, and suspending means movable along the first track means with respect to the base into engagement with a plurality of elements for suspending the elements in spaced relation to each other and above the base, the first track means defining the direction and limits of movement of the suspending means;
    second track means fixed to the base, and sweeping means comprising at least one stub shaft movable along the second track means in a path parallel to said first track means from a first position adjacent to the elements through a second position engaging all the suspended elements for movement of the elements toward a third position free from the suspending means and into a nesting relation to each other, the second track means defining the direction and limits of movement of the sweeping means, and
    abutment means fixed with respect to the base and providing a stop towards which the elements are swept by the sweeping means for accumulating the elements in an accumulated, stacked relationship.

2. The apparatus of claim 1 wherein the suspending means comprises at least one rod movable in the length direction of the rod along the first track means from a non-penetrant position adjacent to the elements to a penetrant position suspending the elements.

3. The apparatus of claim 1 further comprising holding means for holding the elements relative to the base prior to the suspending of the elements by the suspending means, moving means for moving the holding means relative to the base and coordinating means for coordinating the motion of the moving means and the sweeping means.

4. Apparatus for stacking a plurality of elements, each element formed to nest with other similar elements, the apparatus comprising:
    a base and holding means for holding a plurality of elements relative to the base in spaced relation to each other;
    at least two parallel rods movable in the length direction of the rods with respect to the base from a non-penetrant position adjacent to the elements held by the holding means to a penetrant position suspending the elements in spaced relation to each other and above the base;
    at least one stub shaft movable relative to the base in a path parallel to the at least two rods from a first position adjacent to the elements through a second position engaging all the suspended elements and sweeping the elements along the at least two parallel rods into a nesting relation to each other toward a third position free from the parallel rods; and
    abutment means fixed with respect to the base and providing a stop towards which the elements are swept by the at least one stub shaft for accumulating the elements in a stacked relationship.

5. The apparatus of claim 4 further comprising moving means for moving the holding means orthogonally relative to the parallel rods, and coordinating means for coordinating the motion of the moving means and the stub shaft such that the holding means is removed from contact with the elements prior to the sweeping of the elements along the parallel rods.

6. A method of stacking articles ejected from an article forming apparatus comprising the steps of:
    receiving a group of articles ejected from an article forming apparatus in a holding means for holding the articles in spaced relation to each other;
    suspending the group of articles on a suspending means while the articles are still held by the holding means in said spaced relation to each other;
    withdrawing the holding means from contact with the articles once the articles are suspended on the suspending means;

sweeping the articles along the suspending means from a position of spaced relation to each other to a position adjacent to each other, conveying the adjacent articles to an accumulating position, and returning the holding means to a position for receiving a subsequent group of articles.

7. The method of claim 6 wherein the suspending step comprises the step of projecting at least one rod through an aperture in each of the elements held by the holding means.

8. The method of claim 7 wherein the sweeping step comprises the step of moving a sweeping means in the longitudinal direction of the at least one rod to gather the elements into a contiguous relation to each other.

9. The method of claim 8 wherein the returning step comprises the step of raising the holding means to a position for receiving the subsequent group of articles only after the sweeping means and at least one rod are fully returned to a position at one side of the holding means opposite the accumulating position.

10. The method of claim 8 wherein the conveying step is performed by the sweeping means.

* * * * *